US012557183B2

(12) United States Patent
Akao et al.

(10) Patent No.: US 12,557,183 B2
(45) Date of Patent: Feb. 17, 2026

(54) CERAMIC HEATER AND METHOD OF MANUFACTURING THE CERAMIC HEATER

(71) Applicant: NGK Insulators, Ltd., Nagoya (JP)

(72) Inventors: Takayoshi Akao, Kasugai (JP); Natsuki Hirata, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 803 days.

(21) Appl. No.: 17/817,048

(22) Filed: Aug. 3, 2022

(65) Prior Publication Data

US 2022/0377850 A1 Nov. 24, 2022

Related U.S. Application Data

(63) Continuation of application No. PCT/JP2021/006589, filed on Feb. 22, 2021.

(30) Foreign Application Priority Data

Feb. 26, 2020 (JP) ................................ 2020-030725

(51) Int. Cl.
*H05B 3/14* (2006.01)
*H05B 3/28* (2006.01)

(52) U.S. Cl.
CPC ............ *H05B 3/143* (2013.01); *H05B 3/283* (2013.01); *H05B 2203/003* (2013.01); *H05B 2203/017* (2013.01)

(58) Field of Classification Search
CPC ...... H05B 3/143; H05B 3/283; H05B 3/0047; H05B 2203/002; H05B 2203/017
See application file for complete search history.

(56) References Cited

U.S. PATENT DOCUMENTS

2005/0252903 A1 11/2005 Maki et al.
2018/0177273 A1* 6/2018 Jeong ....................... A45D 1/08

FOREIGN PATENT DOCUMENTS

JP 2002-190373 A 7/2002
JP 2004-296445 A 10/2004
JP 2006-054125 A 2/2006
JP 2006-228633 A 8/2006

OTHER PUBLICATIONS

International Search Report and Written Opinion (Application No. PCT/JP2021/006589) dated Apr. 27, 2021 (with English translation).
English translation of International Preliminary Report on Patentability (Chapter I) (Application No. PCT/JP2021/006589) 5 pages dated Sep. 9, 2022.
Chinese Office Action (Application No. 202180007507.8) dated Jun. 11, 2025 (with English translation) (15 pages).

* cited by examiner

*Primary Examiner* — Brian W Jennison
(74) *Attorney, Agent, or Firm* — BURR PATENT LAW, PLLC

(57) ABSTRACT

An electrostatic chuck heater includes a resistance heating element. A region of the resistance heating element from one end to another end of the resistance heating element is divided into a plurality of sections. Recessed grooves are provided in the respective sections along a longitudinal direction of the resistance heating element in a surface. In a connection portion between the recessed grooves that are provided in the adjacent sections, a projection portion that extends along the connection portion is provided.

8 Claims, 9 Drawing Sheets

CERAMIC HEATER AND METHOD OF MANUFACTURING THE CERAMIC HEATER

BACKGROUND OF THE INVENTION

1. Field of the Invention

The present invention relates to a ceramic heater and a method of manufacturing the ceramic heater.

2. Description of the Related Art

Hitherto, a ceramic heater used for a semiconductor manufacturing apparatus is known. For example, PTL 1 discloses a ceramic heater and a method of manufacturing the ceramic heater in which a resistance heating element is provided on a surface of a ceramic substrate. PTL 1 also discloses that, after the resistance heating element has been formed, the resistance heating element in divided into a plurality of sections, the resistance of each section is measured, and, based on the measured resistance, the resistance of the resistance heating element is adjusted by radiating laser light to a section having a low resistance so as to form a groove.

CITATION LIST

Patent Literature

PTL 1: JP 2002-190373 A

SUMMARY OF THE INVENTION

However, when it is attempted to connect the recessed grooves R provided in the adjacent sections to each other without a gap therebetween, the depth of a connection portion between the recessed grooves may be partially excessively increased due to overlap of irradiation of the laser light. In a portion where the depth is partially increased as described above, the resistance excessively increases, and heat generation at that portion becomes greater than other portions. This may degrade the thermal uniformity of the surface of the ceramic heater.

The present invention is made to address such a problem, and a main object of the present invention is to improve thermal uniformity of a surface of a ceramic heater including a resistance heating element having recessed grooves.

A ceramic heater according to the present invention includes a resistance heating element. In the ceramic heater, a region of the resistance heating element from one end to another end of the resistance heating element is divided into a plurality of sections. Recessed grooves are provided in the respective sections along a longitudinal direction of the resistance heating element in a surface of the resistance heating element. In a connection portion between the recessed grooves that are provided in the adjacent sections, a projection portion that extends along the connection portion is provided.

In this ceramic heater, current flows in the longitudinal direction of the resistance heating element. Even when the projection portion that extends along the connection portion exists in the connection portion between the recessed grooves, the current flowing through the resistance heating element rarely enters and flows through the projection portion. Accordingly, the resistance of the current flowing through the adjacent sections is rarely influenced by the existence of the projection portion. Furthermore, when it is attempted to continuously form, by using laser light, the recessed grooves of the adjacent sections without a gap therebetween, the depth of the connection portion between the recessed grooves may become excessively large. In this case, the resistance of the connection portion between the recessed grooves becomes higher than other portions in the resistance heating element, and heat generation at the connection portion excessively increases compared to the other portions. However, this does not occur according to the present embodiment. Accordingly, the thermal uniformity of the surface of the ceramic heater can be improved.

In the ceramic heater according to the present invention, when a cross-section of the projection portion cut along a surface along the longitudinal direction of the resistance heating element is seen, the projection portion may appear as a chevron shape having a foot width of smaller than or equal to 95 μm. In this way, since the foot width of the projection portion is sufficiently small, the current flowing through the resistance heating element hardly enters and flows through the projection portion.

In the ceramic heater according to the present invention, a depth of the recessed grooves may be set to be a uniform value (tolerances and errors are allowed) irrespective of the sections, and a width of the recessed grooves may be set on a section-by-section basis. In this way, when the width of the recessed grooves is adjusted, the resistance of the corresponding sections of the resistance heating element can be adjusted.

In the ceramic heater according to the present invention, a center line of the recessed grooves may be coincident with a center line of the resistance heating element (tolerances and errors are allowed). In this way, since a temperature distribution of the resistance heating element in the width direction is substantially symmetrical about the center line, it is easy to preferably maintain the thermal uniformity of the surface of the ceramic heater.

In the ceramic heater according to the present invention, the recessed grooves are not necessarily provided in a portion of the resistance heating element in which a heat removal action is low. When the recessed grooves are provided in the portion of the resistance heating element in which the heat removal action is low, the resistance and heat generation of this portion increases while the heat is unlikely to be removed from this portion. Thus, a hot spot is likely to be generated. Here, the recessed groove is not provided in the portion of the resistance heating element in which the heat removal action is low. Thus, such a hot spot is unlikely to be generated. Examples of the portion in which the heat removal action is low include, for example, terminal portions or the like provided at one end and the other end of the resistance heating element in the case where a cooling plate is bonded or jointed to a lower surface of the ceramic heater. Power feed terminals that penetrate through the cooling plate are connected to the terminal portions, and heat dissipation of the power feed terminals is poor compared to that of the cooling plate. Thus, the terminal portions are portions in which the heat removal action is low.

In the ceramic heater according to the present invention, regardless of whether a longitudinal direction of a shape of the sections in plan view is straight or curved, a longitudinal direction of a shape of the recessed grooves in plan view may be straight. In this way, the recessed grooves can be formed with good accuracy when the recessed grooves are formed by the laser light.

In the ceramic heater according to the present invention, regardless of whether the longitudinal direction of the shape of the sections in plan view is straight or curved, the foot width of the projection portion may be uniform (tolerances and errors are allowed) except for both end portions of the connection portion in a width direction of the recessed grooves. In this way, in the connection portion between the recessed grooves, the distribution of the resistance in the width direction of the resistance heating element is hardly generated.

A method of manufacturing a ceramic heater according to the present invention includes the steps of (a) forming, on a surface of a first ceramic fired layer or an unfired layer, a resistance heating element or a precursor of the resistance heating element in a predetermined pattern, (b) by radiating laser light to a plurality of sections obtained by dividing the resistance heating element or the precursor of the resistance heating element along a longitudinal direction of the resistance heating element or the precursor of the resistance heating element, forming respective recessed grooves along the longitudinal direction of the resistance heating element or the precursor of the resistance heating element, (c) obtaining a layered body by disposing, on the surface of the first ceramic fired layer or the unfired layer, a second ceramic unfired layer such that the second ceramic unfired layer covers the resistance heating element or the precursor of the resistance heating element, and (d) obtaining the ceramic heater that includes the resistance heating element disposed in a ceramic substrate by performing hot press firing on the layered body. In the step (b), in a connection portion between the recessed grooves that are provided in the adjacent sections, a projection portion that extends along the connection portion remains.

In the step (b) of this method of manufacturing a ceramic heater, in the connection portion between the recessed grooves that are provided in the adjacent sections, the projection portion that extends along the connection portion remains. With this, for example, a recessed groove provided in one of the adjacent sections is prevented from being irradiated with the laser light for forming a recessed groove in the other of the adjacent sections. In this way, the recessed grooves of the adjacent sections do not overlap each other. This can prevent generation of a portion having a large depth (a portion where the resistance is high and heat is likely to be generated) in the connection portion between the recessed grooves of the adjacent sections.

This method of manufacturing a ceramic heater is suitable for manufacturing the above-described ceramic heater. For example, in the step (b), when a cross-section of the projection portion cut along a surface along the longitudinal direction of the resistance heating element is seen, the projection portion may appear as a chevron shape having a foot width of smaller than or equal to 95 μm.

The "ceramic fired layer" is a layer of ceramic having been fired and, for example, may be a layer of a ceramic fired body (sintered body) or a layer of a ceramic calcined body. The "ceramic unfired layer" is a layer of ceramic not having been fired and may be, for example, a layer of ceramic powder or a layer of a ceramic molded body (including a dried molded body, a dried and degreased molded body, a ceramic green sheet, or the like). The "precursor of the resistance heating element" is a substance that is to, be fired so as to become the resistance heating element and that is formed by, for example, printing the resistance heating element paste. The "layered body" may be a structure in which the second ceramic unfired layer is disposed on the surface of the first ceramic fired layer or the unfired layer such that the second ceramic unfired layer covers the resistance heating element or the precursor of the resistance heating element or may be a structure in which a different layer (for example, a third ceramic fired layer or an unfired layer with an electrode or a precursor of the electrode provided on the second ceramic unfired layer side) is further superposed on the second ceramic unfired layer.

DETAILED DESCRIPTION OF THE INVENTION

Figure 1:
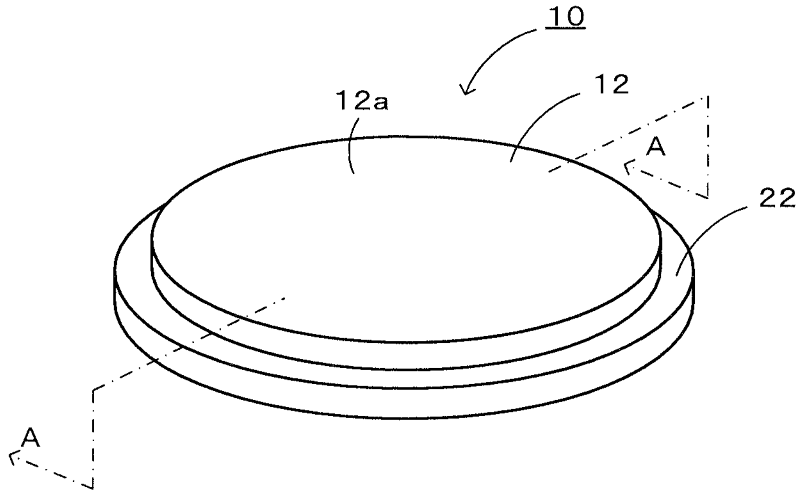
FIG. 1 is a perspective view of an electrostatic chuck heater 10.
Figure 2:
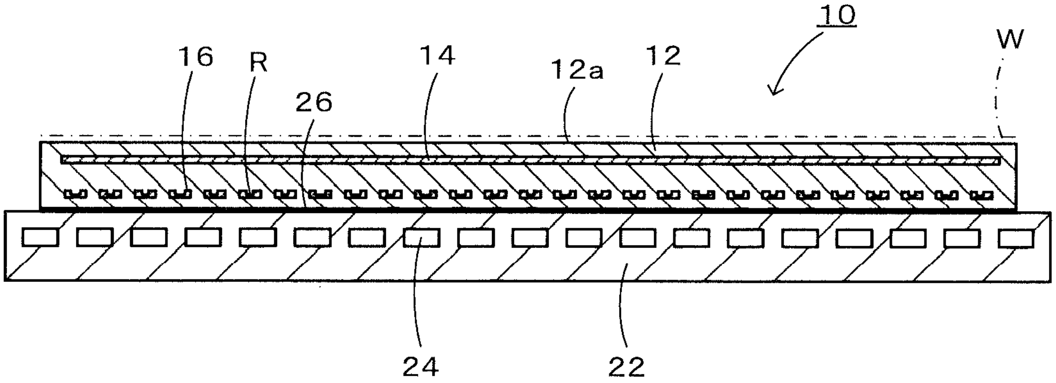
FIG. 2 is a sectional view taken along line A-A illustrated in FIG. 1.
Figure 3:
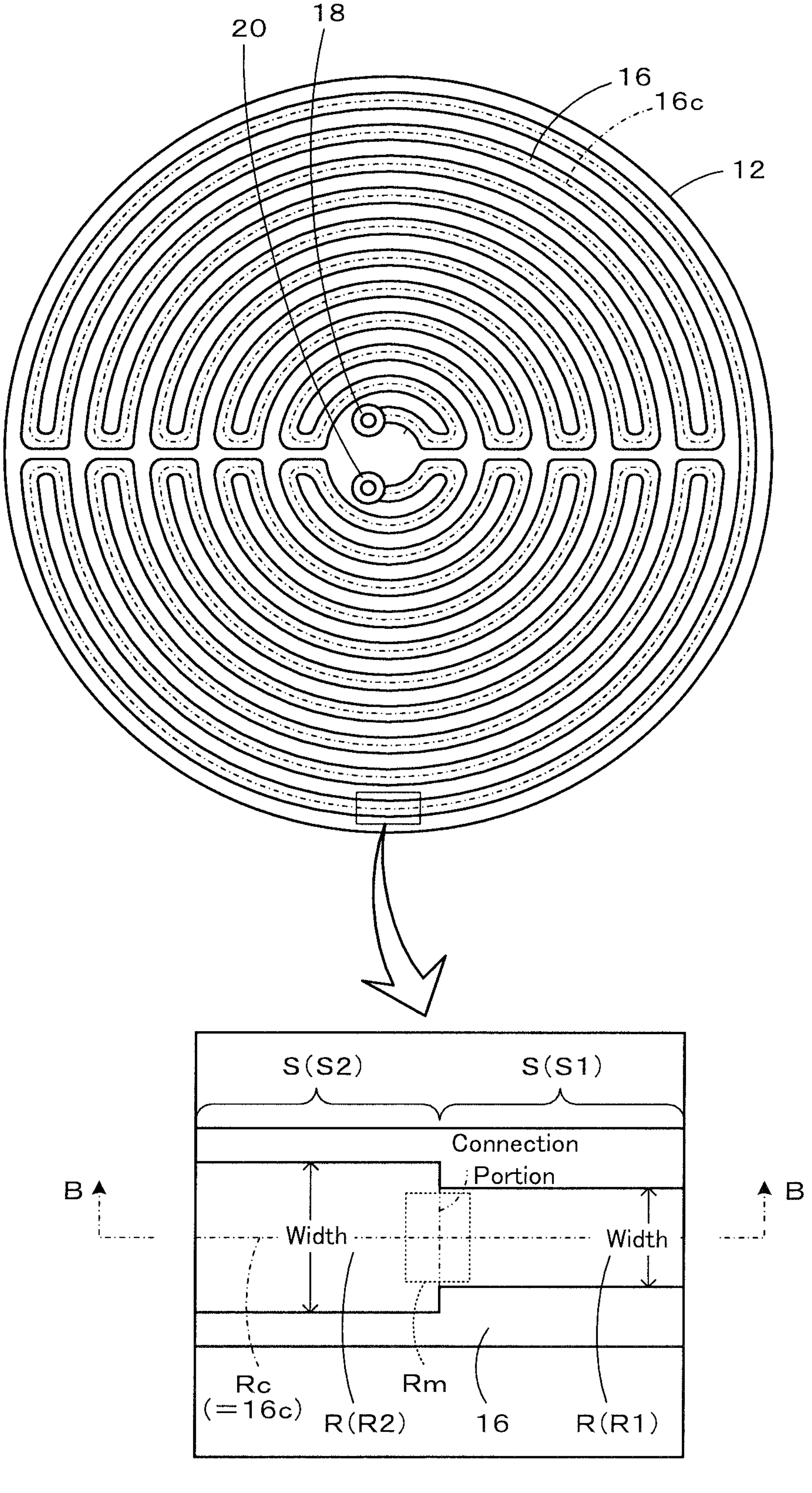
FIG. 3 is an explanatory view when a resistance heating element 16 is seen in plan view.
Figure 4:
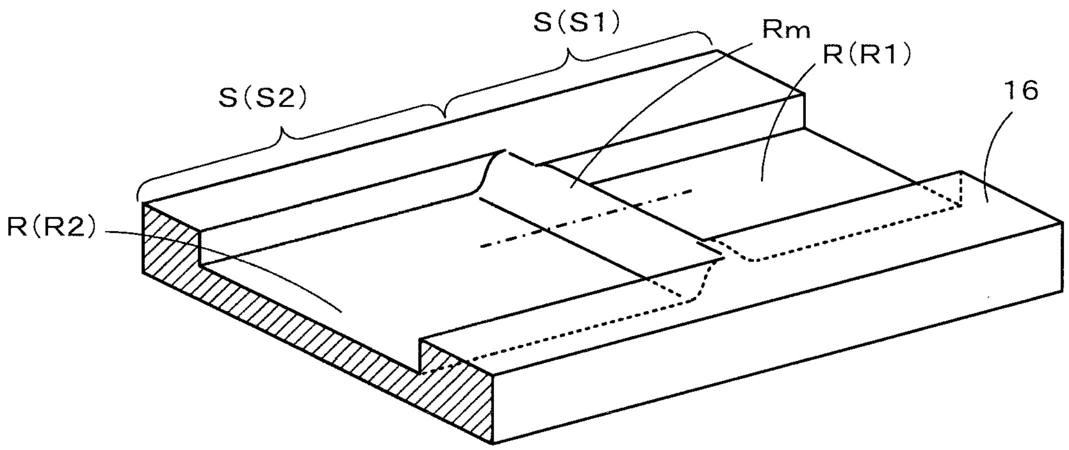
FIG. 4 is a perspective view of part illustrated in the rectangular box of FIG. 3.
Figure 5:
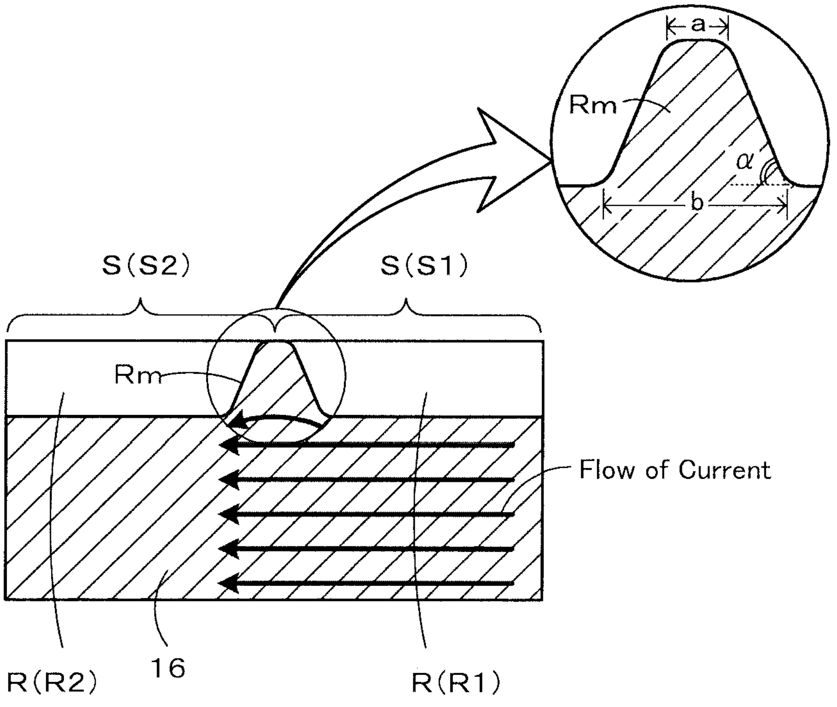
FIG. 5 is a sectional view taken along line B-B illustrated in FIG. 3.
Figure 6:
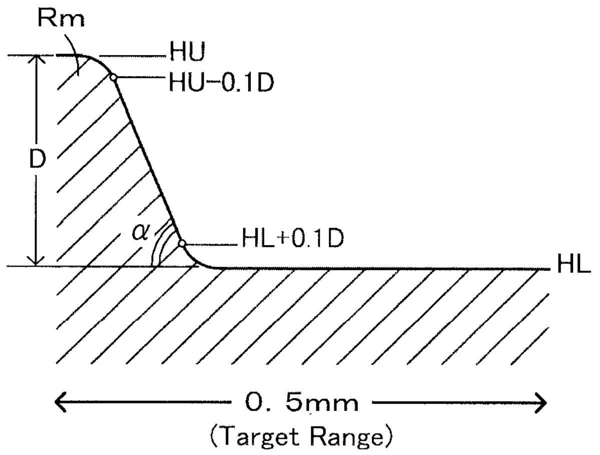
FIG. 6 is an explanatory view of a method of obtaining an inclination angle α.
Figure 7:
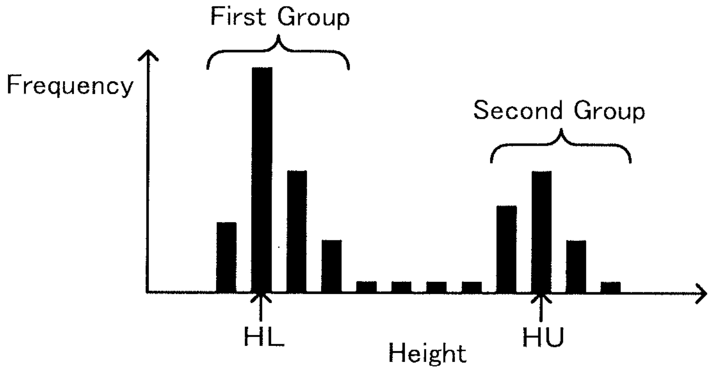
FIG. 7 is a histogram in which the height of the resistance heating element 16 is represented along the horizontal axis and the frequency is represented along the vertical axis.
Figure 8:
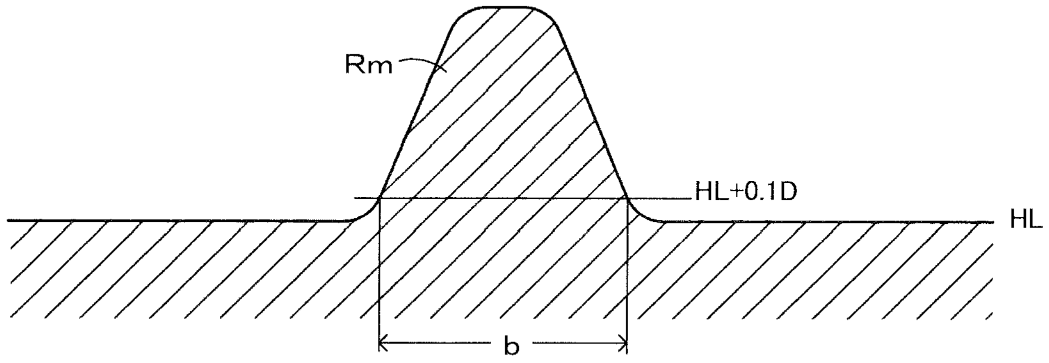
FIG. 8 is an explanatory view of a method of obtaining the width of a foot of a projection portion Rm.
Figure 9:
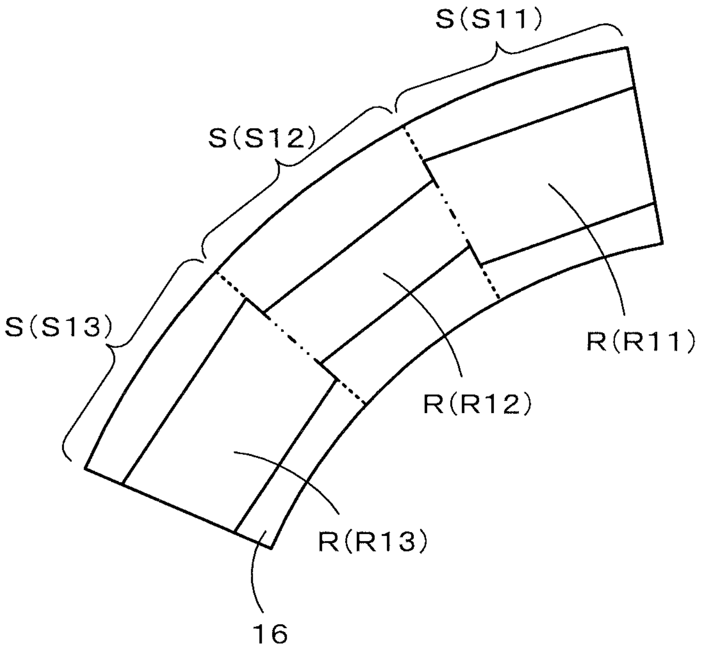
FIG. 9 is a plan view of a curved portion of the resistance heating element 16.

Next, an embodiment of the present invention is described with reference to the drawings. FIG. 1 is a perspective view of an electrostatic chuck heater 10 according to the present embodiment, FIG. 2 is a sectional view taken along line A-A illustrated in FIG. 1, FIG. 3 is an explanatory view when a resistance heating element 16 is seen in plan view (an enlarged view of part of the resistance heating element 16 is illustrated in a rectangular box), FIG. 4 is a perspective view of the part illustrated in the rectangular box of FIG. 3, FIG. 5 is a sectional view taken along line B-B illustrated in FIG. 3, FIG. 6 is an explanatory view of a method of obtaining an inclination angle α, FIG. 7 is a histogram, FIG. 8 is an explanatory view of a method of obtaining the width of the foot of a projection portion Rm, and FIG. 9 is a plan view of a curved portion of the resistance heating element 16.

The electrostatic chuck heater 10 is formed by embedding an electrostatic electrode 14 and the resistance heating element 16 in a ceramic substrate 12. A cooling plate 22 is bonded to a rear surface of the electrostatic chuck heater 10 with a bonding layer 26 interposed therebetween.

The ceramic substrate 12 is a circular plate formed of ceramics (for example alumina or aluminum nitride). A wafer placement surface **12*a* on which a wafer W can be placed is provided on a surface of the ceramic substrate 12**.

The electrostatic electrode 14 is a conductive thin film that is disposed substantially parallel to the wafer placement surface 12*a* and has a circular shape. A rod-shaped terminal (not illustrated) is electrically connected to this electrostatic electrode 14. The rod-shaped terminal extends downward from a lower surface of the electrostatic electrode 14 through the ceramic substrate 12 and the cooling plate 22. The rod-shaped terminal is electrically insulated from the cooling plate 22. Part of the ceramic substrate 12 above the electrostatic electrode 14 functions as a dielectric layer. Examples of the material of the electrostatic electrode 14 include, for example, tungsten carbide, metallic tungsten, molybdenum carbide, metallic molybdenum, and the like. Out of these, it is preferable that a material having a thermal expansion coefficient close to that of the ceramic to be used be selected.

The resistance heating element 16 is a conductive line that is provided on a surface substantially parallel to the wafer placement surface 12*a* and has a strip shape. Although none of the width, the thickness, and the distance between turns of the strip-shaped conductive line is particularly limited, the width, the thickness, and the distance between the turns of the strip-shaped conductive line may be set to, for example, 0.1 to 10 mm, 0.001 to 0.1 mm, and 0.1 to 5 mm, respectively. The resistance heating element 16 is formed by the strip-shaped conductive line routed in a one-stroke pattern from one terminal portion 18 to another terminal portion 20 throughout the ceramic substrate 12 such that the turns of the strip-shaped conductive line do not intersect each other. Power feed terminals (not illustrated) are respectively electrically connected to the terminal portions 18, 20 of the resistance heating element 16. The power feed terminals extend downward from a lower surface of the resistance heating element 16 through the ceramic substrate 12 and the cooling plate 22 under the ceramic substrate 12. The power feed terminals are electrically insulated from the cooling plate 22. Examples of the material of the resistance heating element 16 include, for example, tungsten carbide, metallic tungsten, molybdenum carbide, metallic molybdenum, and the like. Out of these, it is preferable that a material having a thermal expansion coefficient close to that of the ceramic to be used be selected.

A region of the resistance heating element 16 from the one terminal portion 18 to the other terminal portion 20 of the resistance heating element 16 is virtually divided into a plurality of sections S (see the enlarged view of the part illustrated in FIG. 3). A method of determining the sections S according to the present embodiment is as follows: that is, division points at which a center line 16*c* of the resistance heating element 16 is divided by a predetermined length are set; a sectioning line that intersects the center line 16*c* at right angles is drawn at each of the division points; and portions of the resistance heating element 16 between adjacent sectioning lines are defined as the sections S. In this case, the length of the sections S is uniform. Recessed grooves R are provided in the respective sections S along a longitudinal direction of the resistance heating element 16 in a surface of the resistance heating element 16. A center line Rc observed when the recessed grooves R are seen from above is coincident with the center line 16*c* observed when the resistance heating element 16 is seen from above. The center line Rc and the center line 16*c* are regarded as being coincident with each other even when there exists a misalignment due to tolerances or errors. The width of the recessed grooves R is set on a section S-by-section S basis. For example, in the enlarged view of the part illustrated in the rectangular box of FIG. 3 and FIG. 4, regarding the width of the recessed grooves R (recessed grooves R1, R2) provided in the adjacent two sections S (sections S1, S2), the width of the recessed groove R2 is greater than the width of the recessed groove R1. The width of the recessed grooves R provided in the adjacent two sections S is discretely set. The width of the recessed grooves R provided in the adjacent two sections S may be the same. The width of the recessed grooves R correlate with the resistance and the amount of heat generation of the respective sections S in which the recessed grooves R are provided. Accordingly, the width of the recessed grooves R is set based on the resistance and the amount of heat generation in the respective sections S of the resistance heating element 16. The region of the resistance heating element 16 from the one terminal portion 18 to the other terminal portion 20 of the resistance heating element 16 may be divided into two sections S or three or more sections S.

When the cross-section of the resistance heating element 16 vertically cut along a surface along the longitudinal direction of the resistance heating element 16 (a sectional view of the enlarged view of the part illustrated in FIG. 3 taken along line B-B) is seen, as illustrated in FIG. 5, the chevron-shaped projection portion Rm having a foot width (a length b of the lower side) of smaller than or equal to 95 μm exists in a connection portion where the recessed grooves R (R1, R2) provided in the adjacent sections S (S1, S2) are connected each other. The current flowing through the resistance heating element 16 hardly enters and flows through the projection portion Rm. Accordingly, the resistance of the current flowing through the resistance heating element 16 is hardly influenced by the existence of the projection portion Rm. For example, it is preferable that the height of the chevron-shaped projection portion Rm be the same as the depth of the recessed grooves R, a length a of the upper side of the projection portion Rm be greater than or equal to 20 μm and smaller than or equal to 50 μm, a length b of the lower side of the projection portion Rm be smaller than or equal to 95 μm and greater than the length a of the upper side. It is preferable that the length b of the lower side be greater than or equal to 20 μm. Although the inclination angle $\alpha$ of side wall surfaces (inclined surfaces) of the projection portion Rm is not particularly limited, it is preferable that the inclination angle $\alpha$ be from 10° to 30°. The depth of the recessed grooves R is set to be a uniform value irrespective of the sections S. Accordingly, when the width of a recessed groove R is adjusted, the resistance and the amount of heat generation of a section S where the recessed groove R is provided can be adjusted. A bottom surface of each of the recessed grooves R is not a completely horizontal surface and has small irregularities. Accordingly, the depth of the recessed groove R is an average depth. It is preferable that the depth of the recessed groove R be equal to or smaller than half the thickness of the resistance heating element 16. For example, the depth of the recessed groove R can be greater than or equal to 10 μm and smaller than or equal to 30 μm.

Here, methods of obtaining the width of the foot of the projection portion Rm (length b of the lower side) and the inclination angle $\alpha$ are described. First, a scanning electron microscope (SEM) photograph of the cross-section of the connection portion between the adjacent recessed grooves R (R1, R2) of the resistance heating element 16 vertically cut along a surface along the longitudinal direction of the resistance heating element 16 is obtained. Specifically, the SEM photograph of the cross-section of the connection portion cut at about the center in the width direction of the recessed grooves R (see a one-dot chain line illustrated in FIG. 4) is obtained. As illustrated in FIG. 6, in the SEM photograph, a target range of 0.5 mm is set in the width direction of the foot such that one of side surfaces (inclined surfaces) of the projection portion Rm is included. At this time, correction is made such that a bottom surface of the resistance heating element 16 is substantially horizontal. Also, one end (a left end in FIG. 6) of the target range and the center of the projection portion Rm substantially match. It is set that the bottom surface of the resistance heating element 16 is horizontal. The height of the resistance heating element 16 is obtained, by an image analysis of the SEM photograph, throughout the target range at 2.5-μm intervals in the width direction. Then, a graph (histogram) is drawn in which the height of the resistance heating element 16 is represented along the horizontal axis and the frequency is represented along the vertical axis. The height data is at 1 μm intervals. An example of the histogram is illustrated in FIG. 7. In the histogram, a first group that is smaller in height and a second group that is greater in height appear. The first group is a group of the height of the bottom surface of the recessed groove R, and the second group is a group of the height at a top surface of the resistance heating element 16. In the histogram, a value of the highest frequency (mode) in the first group is regarded as a bottom surface height HL of the recessed groove R, and a value of the highest frequency (mode) in the second group is regarded as a top surface height HU of the resistance heating element 16. A value obtained by subtracting HL from HU is defined as a depth D of the recessed groove R. A value obtained by adding 0.1 D to HL is defined as a reference height, and the width of the projection portion Rm at this height is defined as the width of the foot (length b of the lower side) of the projection portion Rm. Also, as illustrated in FIG. 8, a value obtained by subtracting 0.1 D from HU is defined as an upper limit value, the regression line is obtained by using the height obtained at 2.5-μm intervals in a range from the reference height to the upper limit value of the one side surface of the projection portion Rm, and an angle that the regression line forms with the horizontal line is defined as the inclination angle α.

Regardless of whether the longitudinal direction of the shape of the sections S of the resistance heating element 16 in plan view is straight or curved, the longitudinal direction of the shape of the recessed grooves R in plan view is straight. For example, in the enlarged view of the part illustrated in the rectangular box of FIG. 3 and FIG. 4, the longitudinal direction of the shape (rectangle) of the adjacent sections S (S1, S2) in plan view is straight, and, likewise, the longitudinal direction of the shape (rectangle) of the recessed grooves R (R1, R2) in plan view is also straight. Furthermore, in FIG. 9, although the longitudinal direction of the shape (sector) of the adjacent sections S (S11, S12, S13) in plan view is curved (arc), the longitudinal direction of the shape (trapezoid) of the recessed grooves R (R11, R12, R13) in plan view is straight. Thus, as will be described, the recessed grooves R can be formed with good accuracy by using laser light.

Furthermore, regardless of whether the longitudinal direction of the shape of the sections S of the resistance heating element 16 in plan view is straight or curved, it is preferable that a width of the chevron-shaped foot of the projection portion Rm (length b of the lower side in FIG. 5) be substantially uniform except for portions of the connection portion near both ends of the recessed grooves R in the width direction. In this way, in the connection portion between the recessed grooves R, a distribution of the resistance in the width direction of the resistance heating element 16 is hardly generated.

The recessed groove R is provided in neither of the terminal portions 18, 20 of the resistance heating element 16. Although the power feed terminals inserted through through holes of the cooling plate 22 are connected to the terminal portions 18, 20, heat dissipation of the power feed terminals is poor compared to that of the cooling plate 22. Accordingly, the terminal portions 18, 20 are portions with a low heat removal action.

The cooling plate 22 is formed of metal (for example, aluminum) and has therein a coolant path 24 that allows a coolant (for example, water) to pass therethrough. The coolant path 24 is formed so that the coolant passes through the entirety of the ceramic substrate 12. The coolant path 24 is provided with an inlet and outlet for the coolant (neither of the inlet nor the outlet is illustrated).

Next, an example of use of the electrostatic chuck heater 10 is described. When the wafer W is placed on the wafer placement surface 12*a* of the electrostatic chuck heater 10 and a voltage is applied between the electrostatic electrode 14 and the wafer W, the wafer W is attracted to the wafer placement surface 12*a* by an electrostatic force. In this state, the wafer W is subjected to plasma etching or film formation by a plasma chemical vapor deposition (CVD). The temperature of the wafer W is controlled so that the temperature of the wafer W is maintained at a certain temperature by applying the voltage to the resistance heating element 16 to heat the wafer W or circulating the coolant through the coolant path 24 of the cooling plate 22 to cool the wafer W. When applying the voltage to the resistance heating element 16, the voltage is applied between the one terminal portion 18 and the other terminal portion 20 of the resistance heating element 16. This causes the current to flow through the resistance heating element 16, thereby the resistance heating element 16 generates heat to heat the wafer W.

According to the present embodiment, the one terminal portion 18 to the other terminal portion 20 of the resistance heating element 16 is divided into the plurality of sections S, and the recessed groove R is provided in the surface of the resistance heating element 16 in each of the sections S. In a section S where the width of a recessed groove R is large, the resistance increases and the amount of heat generation increases due to a decrease in sectional area of the resistance heating element 16. In a section S where the width of the recessed groove R is small, the resistance decreases and the heat generation amount decreases due to an increase in sectional area of the resistance heating element 16. Accordingly, the heat generation amounts for the sections S of the resistance heating element 16 are matched to respective target heat generation amounts by adjusting the width of recessed grooves R of the sections S.

Figure 11:
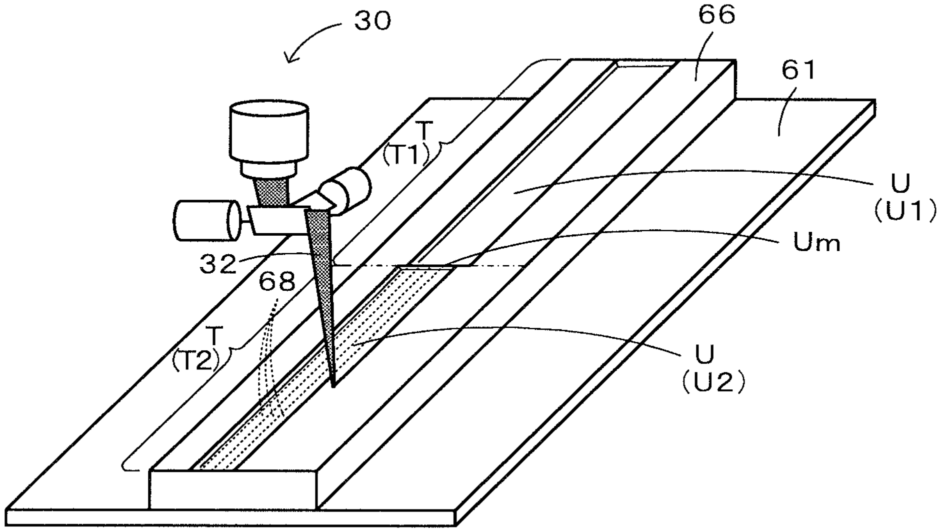
FIG. 11 is an explanatory view of a step of forming a recessed groove U in a resistance heating element precursor 66.
Figure 12:
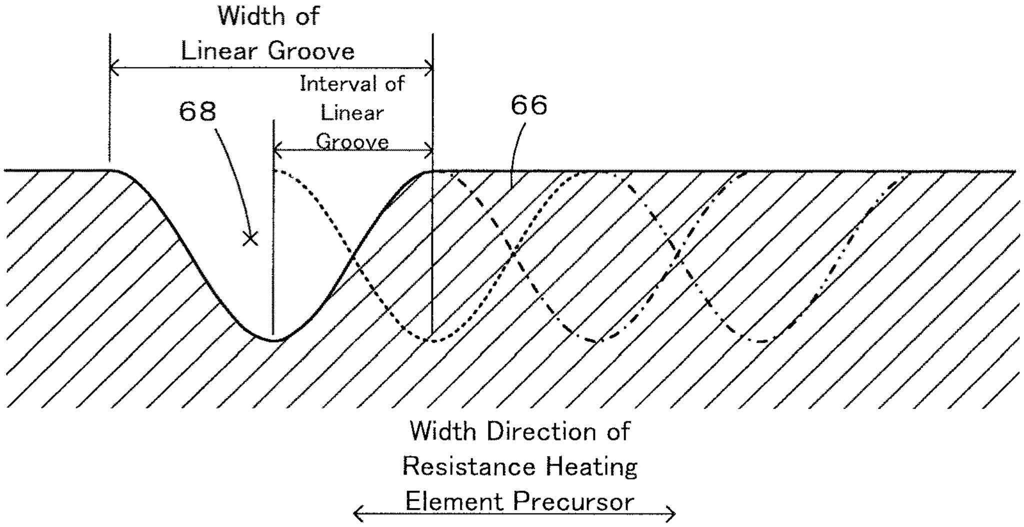
FIG. 12 is a sectional view of linear grooves 68.
Figure 13:
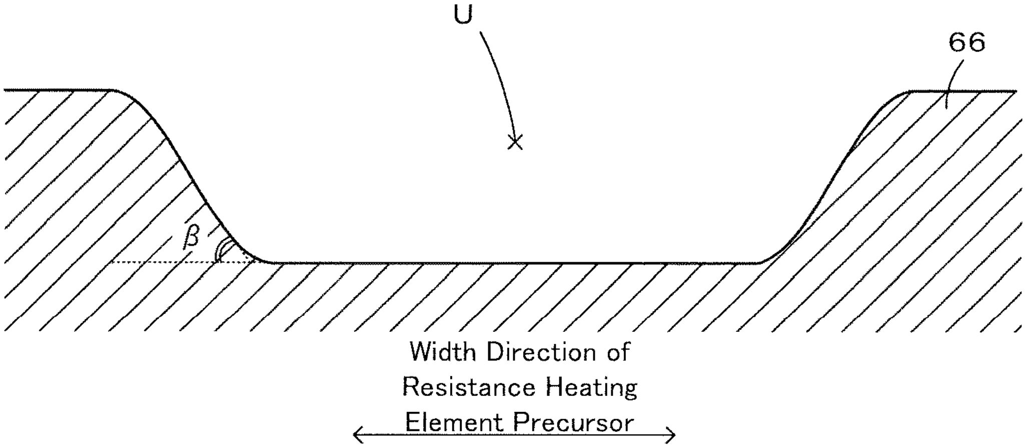
FIG. 13 is a sectional view of the recessed groove U.
Figure 14:
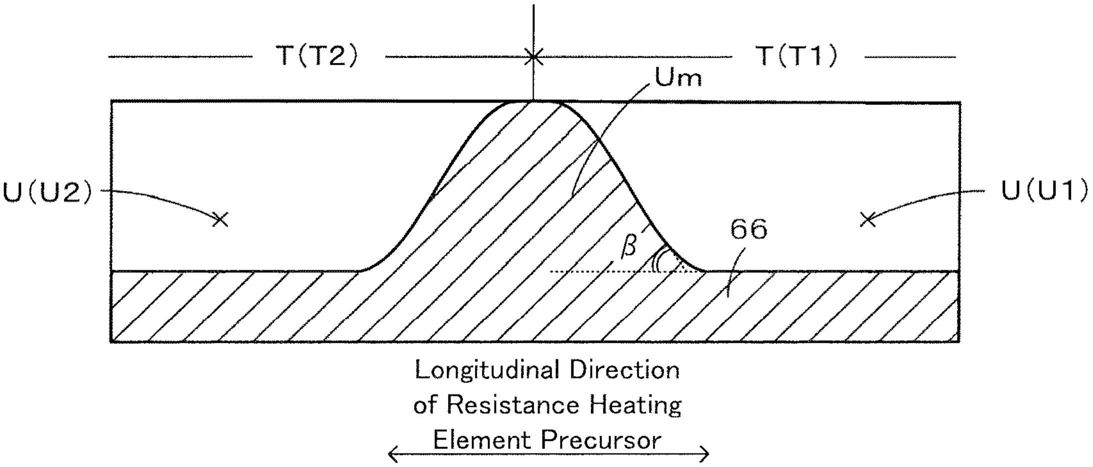
FIG. 14 is a sectional view when a connection portion between recessed grooves U is cut.

Next, an example of the manufacture of the electrostatic chuck heater 10 is described. FIGS. 10A to 10F are manufacturing step diagrams of the electrostatic chuck heater 10, FIG. 11 is an explanatory view of a step of forming a recessed groove U in a resistance heating element precursor 66, FIGS. 12 and 13 are respectively sectional views of linear grooves 68 and the recessed groove U when the resistance heating element precursor 66 is vertically cut along a surface including the width direction of the resistance heating element precursor 66, and FIG. 14 is a sectional view of the connection portion between the adjacent recessed grooves U when the resistance heating element precursor 66 is vertically cut along the surface including the longitudinal direction of the resistance heating element precursor 66. Hereinafter, a case in which an alumina substrate is used as the ceramic substrate 12 is described as the example.

Figures 10A, 10B, 10C, 10D, 10E, 10F:
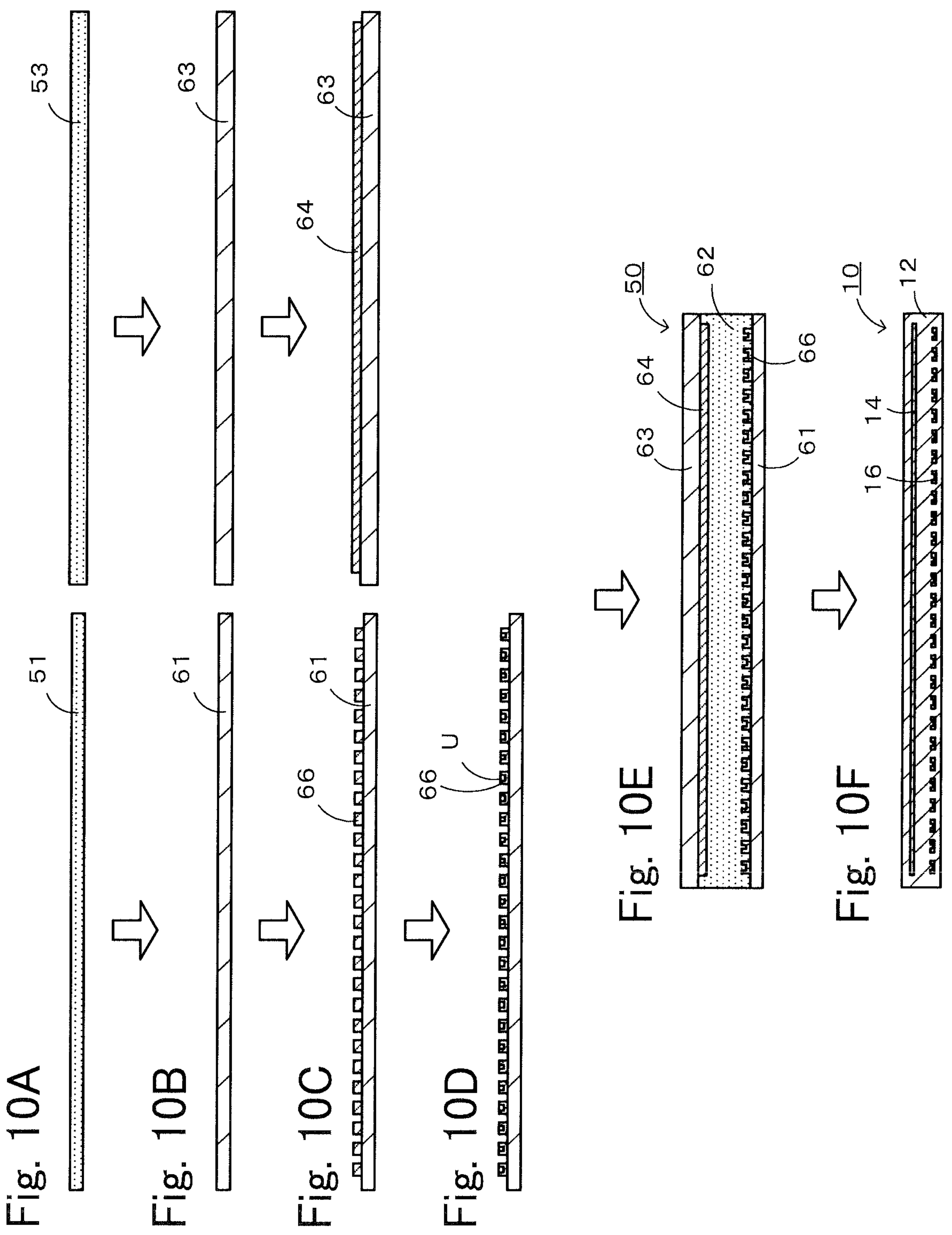
FIGS. 10A to 10F are manufacturing step diagrams of the electrostatic chuck heater 10.

[1] Fabricating of Molded Bodies (see FIG. 10A)

Disc-shaped upper and lower molded bodies 51, 53 are fabricated. Each of the molded bodies 51, 53 is fabricated, for example, first, by charging slurry including alumina powder (for example, having an average particle size of 0.1 to 10 μm), a solvent, a dispersant, and a gelling agent into a mold, making the slurry gelate by causing a chemical reaction of the gelling agent in the mold, and then, releasing from the mold is performed. The molded bodies 51, 53 obtained as described above are referred to as mold casting molded bodies.

The solvent is not particularly limited as long as the dispersant and the gelling agent become dissolved in the solvent. Examples of the solvent include, for example, hydrocarbon-based solvents (toluene, xylene, solvent naphtha, and the like), ether-based solvents (ethylene glycol monoethyl ether, butyl carbitol, butyl carbitol acetate, and the like), alcohol-based solvents (isopropanol, 1-butanol, ethanol, 2-ethyl hexanol, terpineol, ethylene glycol, glycerin, and the like), ketone-based solvents (acetone, methyl ethyl ketone, and the like), ester-based solvents (butyl acetate, glutaric acid dimethyl, triacetin, and the like), and polybasic acid-based solvents (glutaric acid and the like). In particular, it is preferable that a solvent having two or more ester bonds such as a polybasic acid ester (for example, glutaric acid dimethyl or the like), an acid ester of a polyhydric alcohol (for example, triacetin or the like) be used.

The dispersant is not particularly limited as long as the alumina powder uniformly disperses in the solvent. Examples of the dispersant include, for example, a polycarboxylic acid-based copolymer, a polycarboxylate, a polysorbate, a polyglycerol ester, a phosphate ester salt-based copolymer, a sulfonate-based copolymer, a polyurethane polyester-based copolymer having tertiary amine, and the like. In particular, it is preferable that a polycarboxylic acid-based copolymer, a polycarboxylate, or the like be used. When this dispersant is added, the slurry before the molding can have a low viscosity and a high fluidity.

The gelling agent can include, for example, isocyanates, polyols, and a catalyst. Out of these, the isocyanates are not particularly limited as long as the isocyanates are substances having an isocyanate group as a functional group, and examples of the isocyanates include, for example, a tolylenediisocyanate (TDI), a diphenylmethane diisocyanate (MDI), denatured substances of these, and the like. In a molecule, a functional group other than the isocyanate group may be included. Furthermore, many reactive functional groups may be included as is the case with a polyisocyanate. The polyols are not particularly limited as long as the polyols are substances having two or more hydroxy groups that can react with the isocyanate group. Examples of the polyols include, for example, ethylene glycol (EG), polyethylene glycol (PEG), propylene glycol (PG), polypropylene glycol (PPG), polytetramethylene glycol (PTMG), polyhexamethylene glycol (PHMG), polyvinyl alcohol (PVA), and the like. The catalyst is not particularly limited as long as the catalyst is a substance that promotes urethane reaction between the isocyanates and the polyols. Examples of the catalyst include, for example, triethylenediamine, hexanediamine, 6-dimethylamino-1-hexanol, and the like.

It is preferable that this step be performed as follows: first, a slurry precursor is prepared by adding the solvent and the dispersant to the alumina powder in predetermined proportions and mixing these for a predetermined length of time; and then, the slurry is obtained by adding the gelling agent to the slurry precursor, mixing the gelling agent and the slurry precursor, and vacuum deaerating the mixture. A method of mixing for preparing the slurry precursor and the slurry is not particularly limited. For example, a ball mill, planetary centrifugal mixing, vibrating mixing, propeller mixing, or the like is usable. Since the chemical reaction (urethane reaction) of the gelling agent starts to progress over time, it is preferable that the slurry obtained by adding the gelling agent to the slurry precursor be quickly poured into the mold. The slurry having poured into the mold gelates when the gelling agent included in the slurry undergoes chemical reaction. The chemical reaction of the gelling agent is a reaction in which urethane resin (polyurethane) is produced by the occurrence of the urethane reaction between the isocyanates and the polyols. The slurry gelates due to the reaction of the gelling agent, and the urethane resin functions as an organic binder.

[2] Fabricating of Calcined Bodies (See FIG. 10B)

The upper and lower molded bodies 51, 53 having been dried are then degreased, and further, calcined to obtain calcined bodies 61, 63. The molded bodies 51, 53 are dried so as to evaporate the solvent included in the molded bodies 51, 53. The drying temperature and the drying time can be appropriately set in accordance with the solvent in use. However, the drying temperature is carefully set so as not to allow cracking of the molded bodies 51, 53 under drying. The atmosphere may be any one of an air atmosphere, an inert atmosphere, and a vacuum atmosphere. The molded bodies 51, 53 having been dried are degreased so as to decompose and remove the organic substances such as the dispersant, the catalyst, or the binder. The degrease temperature can be appropriately set in accordance with the types of the included organic substances. For example, the degrease temperature may be set to 400 to 600° C. The atmosphere may be any one of an air atmosphere, an inert atmosphere, and a vacuum atmosphere. The degreased molded bodies 51, 53 are calcined so as to increase the strength and ease of handling. The calcination temperature is not particularly limited. For example, the calcination temperature may be set to 750 to 900° C. The atmosphere may be any one of an air atmosphere, an inert atmosphere, and a vacuum atmosphere.

[3] Forming of Resistance Heating Element Precursor (See FIG. 10C)

The resistance heating element precursor 66 is formed by printing paste for the resistance heating element on one of surfaces of the lower calcined body 61 such that the paste for the resistance heating element has the same pattern as that of the resistance heating element 16 and, then, drying the paste for the printed resistance heating element. Also, an electrostatic electrode precursor 64 is formed by printing paste for the electrostatic electrode on one of surfaces of the upper calcined body 63 such that the paste for the electrostatic electrode has the same pattern as that of the electrostatic electrode 14 and, then, drying the paste for the electrostatic electrode. Both of types of the paste include alumina powder, conductive powder, a binder, and a solvent. As the alumina powder, alumina powder similar to that used for, for example, fabricating the molded bodies 51, 53 may be used. Examples of the conductive powder include, for example, tungsten carbide powder. Examples of the binder include, for example, cellulose-based binders (ethyl cellulose and the like), acrylic-based binders (polymethyl methacrylate and the like), vinyl-based binders (polyvinyl butyral and the like). Examples of the solvent include, for example, terpineol and the like. Examples of a method of printing include, for example, a screen printing method and the like. The printing is performed a plurality of number of times. Thus, each of the precursors 66, 64 has a multilayered structure.

[4] Forming of Recessed Grooves (See FIG. 10D and FIGS. 11 to 14)

The recessed grooves U are formed in the resistance heating element precursor 66 provided in the one surface of the lower calcined body 61. A region from one end to the other end of the resistance heating element precursor 66 is virtually divided into a plurality of sections T as is the case with the sections S of the resistance heating element 16. The recessed grooves U are each formed in a surface of the resistance heating element precursor 66 in a corresponding one of the sections T. Each of the recessed grooves U is formed by a pico-second laser machining system 30 illustrated in FIG. 11. The pico-second laser machining system 30 radiates laser light 32 along the longitudinal direction of the resistance heating element precursor 66 while driving a motor for a galvano mirror and a motor for a stage, thereby forming the linear grooves 68. The width of linear grooves 68 is not particularly limited. For example, the width of the linear grooves 68 is preferably 10 to 100 μm, and more preferably 20 to 60 μm. The pico-second laser machining system 30 provides a plurality of such linear grooves 68 so as to overlap each other in the width direction of the resistance heating element precursor 66, thereby forming the recessed groove U. In the laser light 32, the energy is highest at the center of the irradiated portion and decreases as the distance from the center increases. Thus, the cross-section of the linear grooves 68 have a shape close to Gaussian as illustrated in FIG. 12. When the spacing between the linear grooves 68 is set to half the width of the linear grooves 68, the cross-section of the laser light 32 for forming the next linear groove 68 from the current linear groove 68 is as indicated by a dotted line illustrated in FIG. 12, the cross-section of the laser light 32 for forming the linear groove 68 following the next linear groove 68 is as indicated by a one-dot chain line illustrated in FIG. 12, and the cross-section of the laser light 32 for forming the linear groove 68 following the following linear groove 68 is as indicated by a two-dot chain line illustrated in FIG. 12. Thus, when all the linear grooves 68 have been formed, the recessed groove U having the bottom surface the shape of which is close to a substantially flat shape is obtained as illustrated in FIG. 13. The recessed groove U is an aggregation of the linear grooves 68. Side wall surfaces of the recessed groove U are inclined relative to a horizontal surface (a surface of the lower calcined body 61). It is preferable that an inclination angle β of each of the side wall surfaces (see FIG. 13) be smaller than or equal to 45°. When considering the workability with the laser light 32, it is preferable that the inclination angle β be greater than or equal to 18°. The inclination angle β varies depending on the output of the laser light 32 and the number of times of processing with the laser light 32 (number of times of irradiation with the laser light 32 at the same position). The inclination angle β can be obtained by a method similar to that of the above-described inclination angle α. In this case, instead of the SEM photograph, data obtained by measuring, with a contact probe measurement device, the height of the resistance heating element precursor 66 at 2.5-μm intervals in the width direction of the resistance heating element precursor 66 is used.

Moving ranges through which irradiation portion with the laser light 32 moves along the longitudinal direction of the sections T include an acceleration range in which a target speed is reached from a stop state, a fixed speed range in which the irradiation portion moves at the target speed (fixed speed), and a deceleration range in which the irradiation portion moving at the target speed is stopped. In order to form the recessed groove U with good accuracy, the laser light 32 is radiated in the fixed speed range and is not radiated in the acceleration range or the deceleration range. Furthermore, when each of the sections T of the calcined body 61 is subjected to the laser processing to form the recessed groove U, it is preferable that the shape of the linear grooves 68 be straight regardless of whether the shape of the section T is straight or curved. In the case where the section T is curved, when the recessed groove U is formed with a plurality of straight linear grooves 68, the shape of the recessed groove U having been formed in plan view is a trapezoid or a parallelogram. Accordingly, the length of the linear grooves 68 may vary from linear groove 68 to linear groove 68. In such a case, ease of the laser processing increases when control is performed so that the length of the acceleration range and the length of the deceleration range are fixed irrespective of the length of the linear grooves 68 and the length of the fixed speed range is varied in accordance with the length of the linear grooves 68. In contrast, when the recessed groove U is formed by a plurality of curved linear grooves 68 in the case where the section T is curved, the length of the acceleration range and the length of the deceleration range need to be varied in accordance with the radius of curvature of the curve. Thus, the control becomes complex.

The recessed grooves U (U1, U2) of the adjacent sections T (T1, T2) are formed so as not to overlap each other. As a result, as illustrated in FIG. 14, when the cross-section of the resistance heating element precursor 66 vertically cut along a surface including the longitudinal direction of the resistance heating element precursor 66 is seen, a chevron-shaped projection portion Um having a foot length of smaller than or equal to 95 μm is formed in the connection portion between the recessed grooves U (U1, U2) that are provided in the adjacent sections T (T1, T2). The top of the side wall surface (inclined surface, inclination angle β) close to a boundary between the section T1 and the section T2 in the recessed groove U1 formed in the section T1 remains at the height of the resistance heating element precursor 66 before the U groove U1 is formed. The top of the side wall surface (inclined surface) close to the boundary between the section T1 and the section T2 in the recessed groove U2 formed in the section T2 remains at the height of the resistance heating element precursor 66 before the U groove U2 is formed. That is, the height of the projection portion Um is coincident with the depth of the recessed grooves U1, U2. In order to have such a configuration, the recessed grooves U1, U2 are formed while the boundary between the section T1 and the section T2 is not irradiated with the laser light 32 having a Gaussian shape.

To form the recessed grooves U, first, a distribution of the thickness of the resistance heating element precursor 66 before the formation of the recessed grooves U is measured by using a laser displacement meter. This measurement is performed at a plurality of measurement points predetermined along the center line of the resistance heating element precursor 66. According to the present embodiment, the measurement points are defined at intersections of the center line of the resistance heating element precursor 66 and the sectioning lines that section the sections T. For each of the measurement points, the difference between a predetermined target value of the thickness and a measured value of the thickness (difference in thickness) is obtained. The target value of the thickness is set based on a target value of the resistance when the resistance heating element precursor 66 is fired to obtain the resistance heating element 16. Then, based on the difference in thickness at a certain measurement point, the number of the linear grooves 68 formed in a section from the certain measurement point to the adjacent measurement point is determined. The depth of the linear grooves 68 is a predetermined value. Thus, when the number of the linear grooves 68 is varied, the width of the recessed groove U varies, the sectional area of the recessed groove U varies and, further, the sectional area of the resistance heating element precursor 66 varies. That is, the recessed grooves U are formed so that the sectional areas of the resistance heating element precursor 66 at the plurality of measurement points are the predetermined target sectional areas, respectively.

[5] Fabricating of Layered Body (see FIG. 10E)

The alumina powder is superposed on the surface of the lower calcined body 61 on which the resistance heating element precursor 66 is provided such that the alumina powder covers the resistance heating element precursor 66, the upper calcined body 63 is superposed on the alumina powder such that the surface on which the electrostatic electrode precursor 64 is provided is in contact with the alumina powder, and molded. In this way, a layered body 50 is obtained. The layered body 50 has a structure in which a disc-shaped alumina powder layer 62 having the same diameter as those of the calcined bodies 61, 63 is sandwiched between the upper and lower calcined bodies 61, 63. As the alumina powder, alumina powder similar to that used for fabricating the molded bodies 51, 53 may be used.

[6] Hot Press Firing (See FIG. 10F)

The obtained layered body 50 is subjected to hot press firing with the pressure applied in the thickness direction. At this time, since the layered body 50 is blocked by the mold so as not to expand in the radial direction, the layered body 50 is compressed in the thickness direction. Although the compressibility varies depending on the pressure for the pressing, the compressibility is, for example, 30 to 70%. In this way, the resistance heating element precursor 66 is fired and becomes the resistance heating element 16, the electrostatic electrode precursor 64 is fired and becomes the electrostatic electrode 14, and the calcined bodies 61, 63 and the alumina powder layer 62 are sintered, integrated with each other, and become the ceramic substrate 12. Furthermore, the sections T, the recessed grooves U, the projection portion Um respectively become the sections S, the recessed grooves R, and the projection portion Rm. As a result, the electrostatic chuck heater 10 is obtained. The hot press firing is preferably performed at least at a maximum temperature (firing temperature) and the pressure for the pressing of 30 to 300 kgf/cm$^2$, and more preferably, at 50 to 250 kgf/cm$^2$. Although the maximum temperature can be appropriately set depending on the type, the particle size, and the like of the ceramic powder, it is preferable that the maximum temperature be set in a range from 1000 to 2000° C. The atmosphere can be appropriately selected from among an air atmosphere, an inert atmosphere, and a vacuum atmosphere.

Here, correspondence between the elements of the present embodiment and the elements of the present invention is clarified. The electrostatic chuck heater 10 of the present embodiment corresponds to a ceramic heater of the present invention. Also, the forming of the resistance heating element precursor of the present embodiment (see FIG. 10C) corresponds to step (a) of the present invention, the forming of the recessed grooves (see FIG. 10D and FIGS. 11 to 14)) corresponds to step (b), the fabricating of the layered body (see FIG. 10E) corresponds to step (c), the hot press firing (see FIG. 10F) corresponds to step (d), the calcined body 61 corresponds to a first ceramic fired layer, and the alumina powder layer 62 corresponds to a second ceramic unfired layer.

Figure 15:
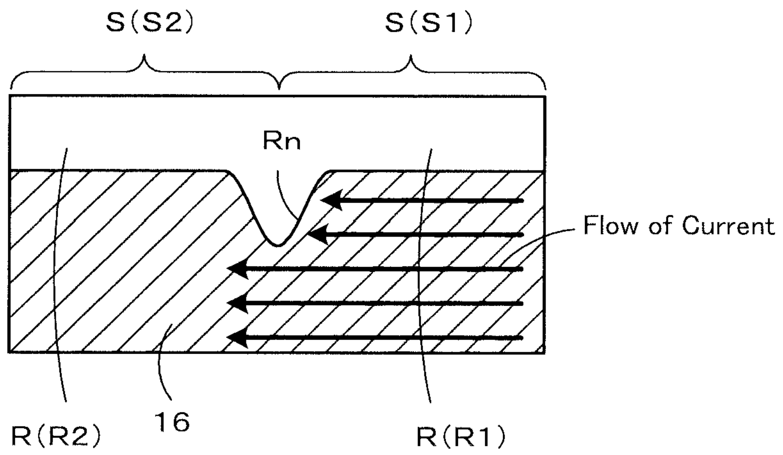
FIG. 15 is a sectional view of a connection portion between the recessed grooves R of a reference example.

In the electrostatic chuck heater 10 according to the present embodiment having been described in detail, the current flows in the longitudinal direction of the resistance heating element 16. Although the chevron-shaped projection portion Rm that extends along the connection portion exists in the connection portion between the recessed grooves R (R1, R2), the current flowing through the resistance heating element 16 rarely enters and flows through the projection portion Rm. Accordingly, the resistance of the current flowing through the adjacent sections S (S1, S2) is rarely influenced by the existence of the projection portion Rm. Furthermore, when it is attempted to continuously form the recessed grooves R (R1, R2) of the adjacent sections S (S1, S2) without a gap therebetween, as illustrated in FIG. 15, the depth of a connection portion Rn between the recessed grooves R (R1, R2) may become excessively large. In this case, the resistance of the connection portion Rn becomes higher than other portions in the resistance heating element 16, and heat generation at the connection portion Rn excessively increases compared to the other portions. However, this does not occur in the present embodiment. Accordingly, the thermal uniformity of the surface of the electrostatic chuck heater 10 can be improved.

In particular, when the cross-section of the resistance heating element 16 vertically cut along a surface along the longitudinal direction of the resistance heating element 16 is seen, the projection portion Rm appears as a chevron shape having a foot width of smaller than or equal to 95 μm. Since such a projection portion Rm has a foot width that is sufficiently small, the current flowing through the resistance heating element 16 hardly enters and flows through projection portion Rm. When the relationship between the foot width of the projection portion Rm and the difference in surface temperature between one side and the other side of the connection portion is investigated, although the difference in surface temperature between the one side and the other side of the connection portion is smaller than 0.1° C. in the case where the foot width of the projection portion Rm is smaller than or equal to 95 μm, this difference exceeds 0.1° C. in the case where the foot width of the projection portion Rm is greater than or equal to 100 μm. Thus, it has been understood that, in the case where the foot width of the projection portion Rm is smaller than or equal to 95 μm, the heat generation amount of the connection portion is substantially the same as those on the one side and the other side of the connection portion, the resistance of the connection portion is substantially the same as those on the one side and the other side of the connection portion, and the current flowing through the resistance heating element 16 hardly enters and flows through the projection portion Rm.

Furthermore, it is preferable that the height of the chevron-shaped projection portion Rm be the same as the depth of the recessed grooves R, the upper side of the projection portion Rm be greater than or equal to 20 μm and smaller than or equal to 50 μm, and the length of the lower side be greater than the length of the upper side in the projection portion Rm. In this way, the projection portion Rm can reliably remain in the connection portion between the recessed grooves R when the recessed grooves R are formed by the laser light.

Furthermore, the depth of the recessed grooves R is set to be a uniform value irrespective of the sections S while the width of the recessed grooves R is set on a section S-by-section S basis. Accordingly, when the width of the recessed grooves R is adjusted, the resistance of the corresponding sections S of the resistance heating element 16 can be adjusted.

Furthermore, the center line Rc of the recessed grooves R is coincident with the center line 16*c* of the resistance heating element 16. Accordingly, since a temperature distribution of the resistance heating element 16 in the width direction is substantially symmetrical about the center line 16*c*, it is easy to preferably maintain the thermal uniformity of the surface of the electrostatic chuck heater 10.

The recessed groove R is provided in neither of the terminal portions 18, 20 where the heat removal action is low in the resistance heating element 16. When the recessed grooves R are provided in the terminal portions 18, 20, the resistance and heat generation of the terminal portions 18, 20 increases while the heat is unlikely to be removed from the terminal portions 18, 20. Thus, a hot spot is likely to be generated. According to the present embodiment, the recessed groove R is provided in neither of the terminal portions 18, 20. Thus, such a hot spot is unlikely to be generated.

Regardless of whether the longitudinal direction of the shape of the sections S in plan view is straight or curved, the longitudinal direction of the shape of the recessed grooves R in plan view is straight. Thus, the recessed grooves R can be formed with good accuracy when the recessed grooves R are formed by the laser light. Furthermore, regardless of whether the longitudinal direction of the shape of the sections S in plan view is straight or curved, the width of the chevron-shaped foot of the projection portion Rm is substantially uniform. Thus, in the connection portion between the recessed grooves R, the distribution of the resistance in the width direction of the resistance heating element 16 is hardly generated.

Furthermore, according to a method of manufacturing the electrostatic chuck heater 10, when the cross-section of the resistance heating element precursor 66 vertically cut along a surface along the longitudinal direction of the resistance heating element precursor 66 is seen, the method is performed so that the chevron-shaped projection portion Um remains in the connection portion between the recessed grooves U (U1, U2) that are provided in the adjacent sections T (T1, T2). In this way, the recessed grooves U of the adjacent sections T do not overlap each other. This can prevent generation of a portion having a large depth (a portion where the resistance is high and heat is likely to be generated) in the connection portion between the recessed grooves U of the adjacent sections T.

Of course, the present invention is not in any way limited to the above-described embodiment, and the present invention can be carried out in a variety of forms as long as the forms belong to the technical scope of the present invention.

For example, although the ceramic heater is exemplified by the electrostatic chuck heater 10 according to the above-described embodiment, the ceramic heater may be a ceramic heater that does not include the electrostatic electrode 14. In this case, the layered body 50 may be fabricated by using the upper calcined body 63 having no electrostatic electrode precursor 64 and subjected to hot press firing, or the layered body 50 from which the upper calcined body 63 is omitted may be fabricated and subjected to hot press firing.

Although the second ceramic unfired layer is exemplified by the alumina powder layer 62 according to the above-described embodiment, an alumina molded body layer or an alumina green sheet may be used instead of the alumina powder layer 62. A dried alumina molded body layer may be used, or an alumina molded body layer degreased after being dried may be used.

Although the first ceramic fired layer is exemplified by the calcined body 61 according to the above-described embodiment, an alumina sintered body may be used instead of the calcined body 61. Alternatively, a ceramic molded body layer or a ceramic green sheet may be used instead of the first ceramic fired layer. A dried ceramic molded body layer may be used, or a ceramic molded body layer degreased after being dried may be used.

Although the paste for the resistance heating element having been printed and, then, dried is used as the resistance heating element precursor 66 in which the recessed groove U is formed according to the above-described embodiment, the paste for the resistance heating element may be degreased after the paste for the resistance heating element has been printed and dried or may be calcined (or fired) after the paste for the resistance heating element has been printed, dried, and degreased.

Although the strip-shaped conductive line routed in a one-stroke pattern throughout the ceramic substrate 12 such that the turns of the strip-shaped conductive line do not intersect each other is employed as the resistance heating element 16 according to the above-described embodiment, this is not limiting. For example, the ceramic substrate 12 may be divided into a plurality of zones, and, in each zone, a corresponding one of resistance heating elements may be provided by routing the corresponding strip-shaped conductive line in a one-stroke pattern such that the turns of the strip-shaped conductive line do not intersect each other. In this case, a structure similar to that of the above-described resistance heating element 16 can be employed for each resistance heating element.

Although the electrostatic chuck heater 10 is exemplified by the structure in which the electrostatic electrode 14 and the resistance heating element 16 are embedded in the ceramic substrate 12 according to the above-described embodiment, a structure in which the electrostatic electrode 14 is embedded in the ceramic substrate 12 and the resistance heating element 16 is provided on the surface of the ceramic substrate 12 may be employed.

Although the length of the plurality of sections S is uniformly set according to the above-described embodiment, this is not limiting. For example, the length of the sections S may vary on a section S-by-section S basis. This is similarly applied to the sections T.

Although the height of the projection portion Rm is the same as the depth of the recessed grooves R according to the above-described embodiment, the height of the projection portion Rm may be a smaller value than that of the depth of the recessed grooves R.

Although the foot width of the projection portion Rm is smaller than or equal to 95 μm according to the above-described embodiment, instead of this or in addition to this, the foot width of the projection portion Rm may be greater than or equal to 1 and smaller than or equal to 20 relative to the depth of the recessed grooves R. Even with such a configuration, since the foot width of the projection portion Rm is sufficiently small, the current flowing through the resistance heating element 16 hardly enters and flows through the projection portion Rm.

Although the height of the projection portion Rm is the same as the depth of the recessed grooves R, the length a of the upper side of the projection portion Rm is greater than or equal to 20 μm and smaller than or equal to 50 μm, and the length b of the lower side (foot width) of the projection portion Rm is greater than the upper side according to the above-described embodiment, instead of these or in addition to these, the length a of the upper side of the projection portion Rm may be greater than or equal to 0 and smaller than or equal to 9 relative to the depth of the recessed grooves R. Alternatively, the height of the projection portion Rm may be greater than or equal to 0.3 and smaller than or equal to 1 relative to the depth of the recessed grooves R. Even with such a configuration, the projection portion Rm can reliably remain in the connection portion between the recessed grooves R when the recessed grooves R are formed by the laser light.

According to the above-described embodiment, a subset of the plurality of sections S of the resistance heating element 16 does not necessarily have the recessed groove R.

The present application claims priority from Japanese Patent Application No. 2020-030725, filed on Feb. 26, 2020, the entire contents of which are incorporated herein by reference.

What is claimed is:

1. A ceramic heater comprising:

a resistance heating element, wherein a region of the resistance heating element from one end to another end of the resistance heating element is divided into a plurality of sections, wherein, recessed grooves are provided in the respective sections along a longitudinal direction of the resistance heating element in a surface of the resistance heating element, and wherein, in a connection portion between the recessed grooves that are provided in the adjacent sections, a projection portion that extends along the connection portion is provided, and wherein a width of the recessed grooves for the respective sections is varied to vary the resistance of the resistance heating element between the plurality of sections.

2. The ceramic heater according to claim 1, wherein, when a cross-section of the projection portion cut along a surface along the longitudinal direction of the resistance heating element is seen, the projection portion appears as a chevron shape having a foot width of smaller than or equal to 95 μm.

3. The ceramic heater according to claim 1, wherein a depth of the recessed grooves is set to be a uniform value irrespective of the sections, and wherein a width of the recessed grooves is set on a section-by-section basis.

4. The ceramic heater according to claim 1, wherein a center line of the recessed grooves is coincident with a center line of the resistance heating element.

5. The ceramic heater according to claim 1, wherein the recessed grooves are not provided in a portion of the resistance heating element in which a heat removal action is low.

6. The ceramic heater according to claim 1, wherein regardless of whether a longitudinal direction of a shape of the sections in plan view is straight or curved, a longitudinal direction of a shape of the recessed grooves in plan view is straight.

7. The ceramic heater according to claim 1, wherein regardless of whether a longitudinal direction of a shape of the sections in plan view is straight or curved, a foot width of the projection portion is uniform except for both end portions of the connection portion in a width direction of the recessed grooves.

8. A method of manufacturing a ceramic heater, the method comprising the steps of:

(a) forming, on a surface of a first ceramic fired layer or an unfired layer, a resistance heating element or a precursor of the resistance heating element in a predetermined pattern;

(b) forming respective recessed grooves along the longitudinal direction of the resistance heating element or the precursor of the resistance heating element by radiating laser light to a plurality of sections obtained by dividing the resistance heating element or the precursor of the resistance heating element along a longitudinal direction of the resistance heating element or the precursor of the resistance heating element;

(c) obtaining a layered body by disposing, on the surface of the first ceramic fired layer or the unfired layer, a second ceramic unfired layer such that the second ceramic unfired layer covers the resistance heating element or the precursor of the resistance heating element; and (d) obtaining the ceramic heater that includes the resistance heating element disposed in a ceramic substrate by performing hot press firing on the layered body, wherein, in the step (b), in a connection portion between the recessed grooves that are provided in the adjacent sections, a projection portion that extends along the connection portion remains.

* * * * *